(12) United States Patent
Odaohhara et al.

(10) Patent No.: US 6,901,520 B2
(45) Date of Patent: May 31, 2005

(54) POWER SUPPLY PROTECTION APPARATUS FOR COMPUTER SYSTEM

(75) Inventors: Shigefumi Odaohhara, Yamato (JP); Arimasa Naitoh, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 09/788,253

(22) Filed: Feb. 16, 2001

(65) Prior Publication Data

US 2001/0014951 A1 Aug. 16, 2001

(30) Foreign Application Priority Data

Feb. 16, 2000 (JP) .......................... 2000-037609

(51) Int. Cl.[7] .............................. G06F 1/28; H02H 3/20
(52) U.S. Cl. ............................ 713/300; 361/1; 361/88
(58) Field of Search ................................ 713/300, 310, 713/330, 340; 323/220, 229; 361/1, 3, 6, 62, 65, 82, 84, 86, 88, 90, 91.1, 91.5

(56) References Cited

U.S. PATENT DOCUMENTS

| 4,605,981 | A | * | 8/1986 | Huvet et al. | ............... 361/91.2 |
| 4,949,235 | A | * | 8/1990 | Barnet | ......................... 363/92 |
| 5,592,353 | A | * | 1/1997 | Shinohara et al. | ............. 361/63 |
| 5,696,979 | A | * | 12/1997 | Saitou | ......................... 713/323 |
| 5,943,246 | A | * | 8/1999 | Porter | ......................... 700/293 |
| 6,125,448 | A | * | 9/2000 | Schwan et al. | ............. 713/300 |

FOREIGN PATENT DOCUMENTS

| JP | 08-251818 | | 9/1996 | ............. H02J/1/00 |
| JP | 10171562 A | | 6/1998 | |
| JP | 11338556 A | * | 12/1999 | ............. G05F/1/10 |
| JP | 11-353062 | | 12/1999 | ............. G06F/1/26 |

* cited by examiner

Primary Examiner—Thuan Du
(74) Attorney, Agent, or Firm—Synnestvedt & Lechner LLP; Carlos Munoz-Bustamante

(57) ABSTRACT

In a power supply protection circuit, a FET and a diode are connected to a power line so as to protect an inner circuit from an excessive voltage caused by a device connected to an IEEE1394 bus. A switching circuit connected to the power line turns off the FET when the voltage of a port exceeds a reference voltage, which is lower than the withstand voltage of the inner circuit.

8 Claims, 5 Drawing Sheets

[Figure 1]
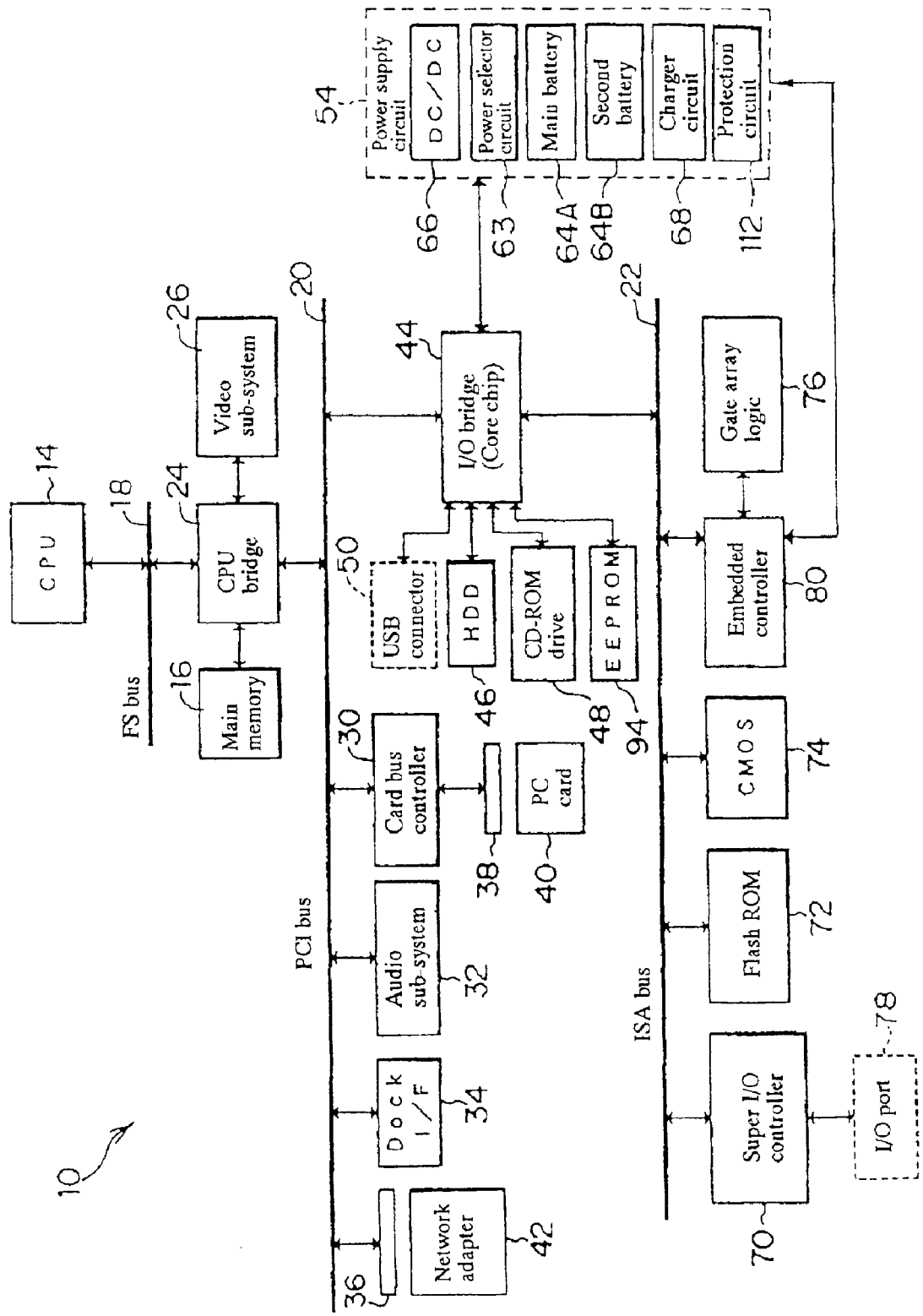

[Figure 2]
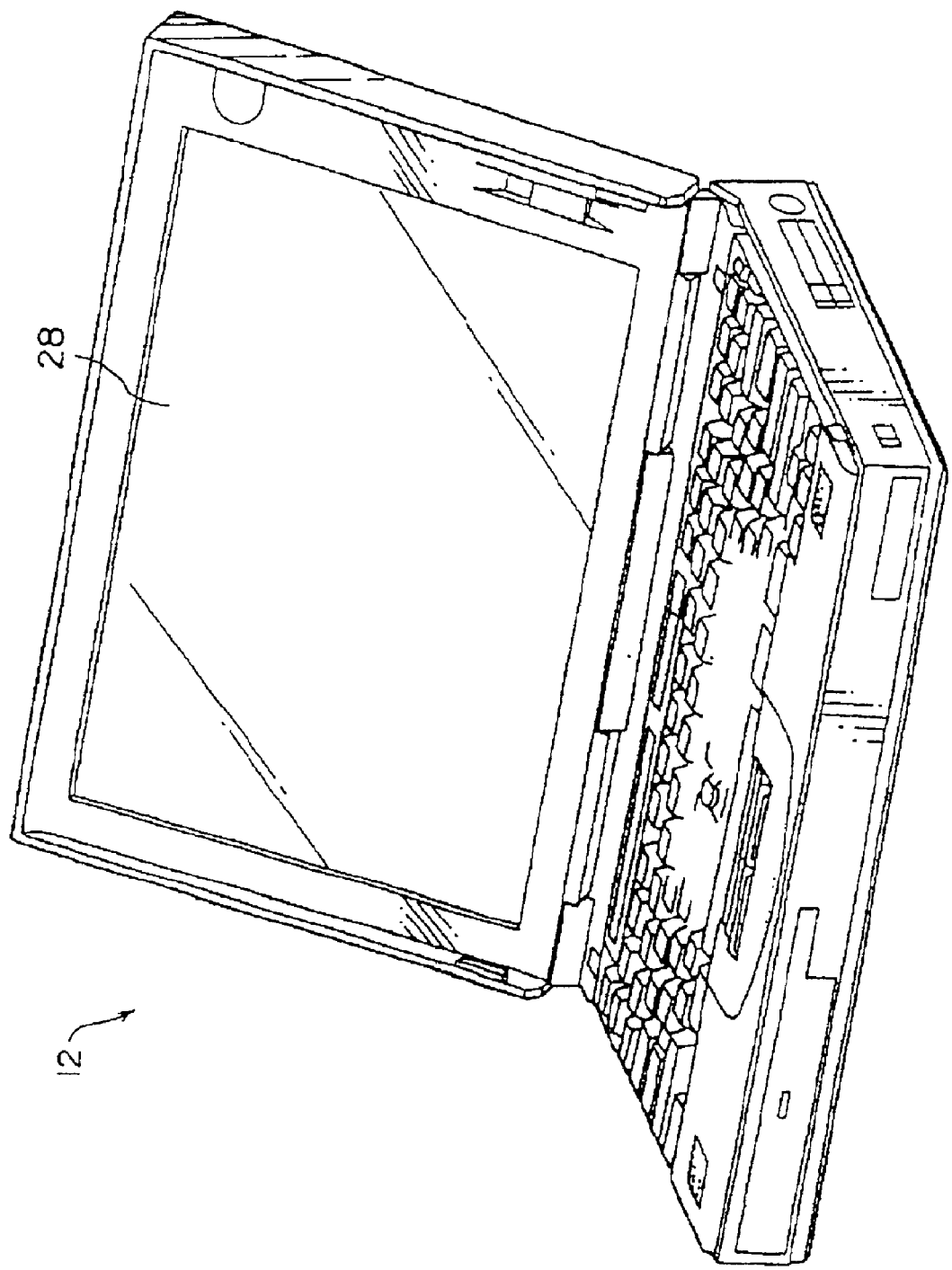

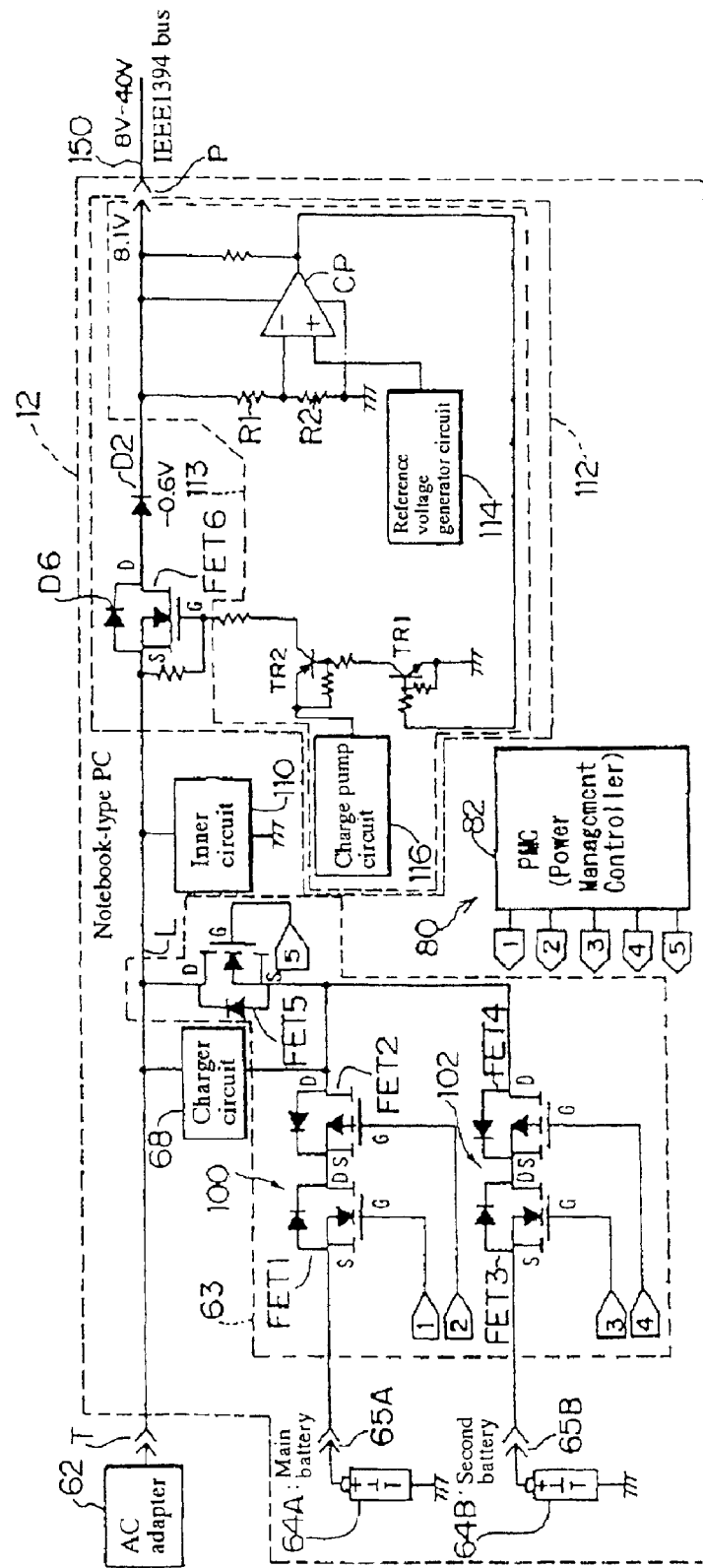
[Figure 3]

[Figure 4]
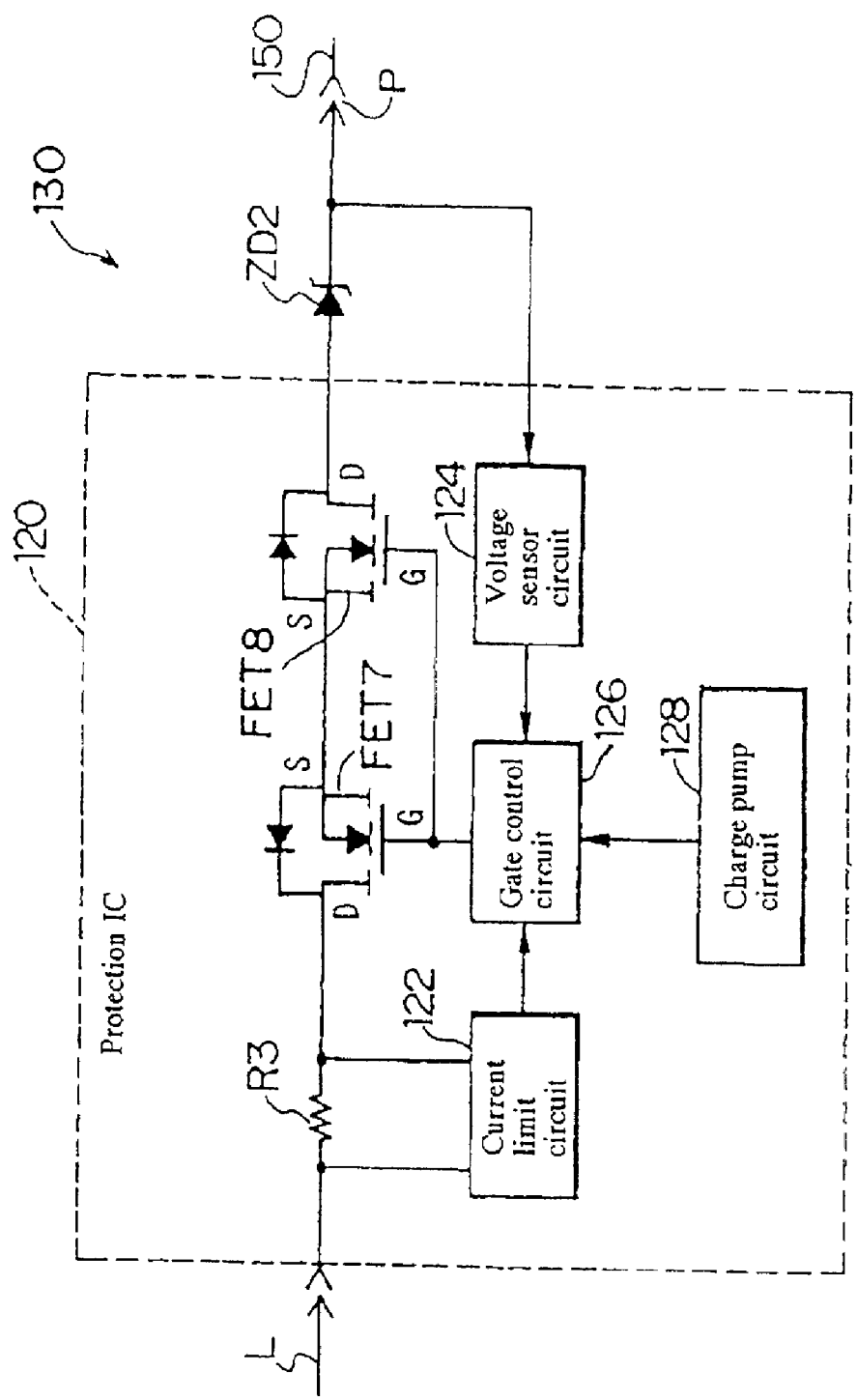

[Figure 5]
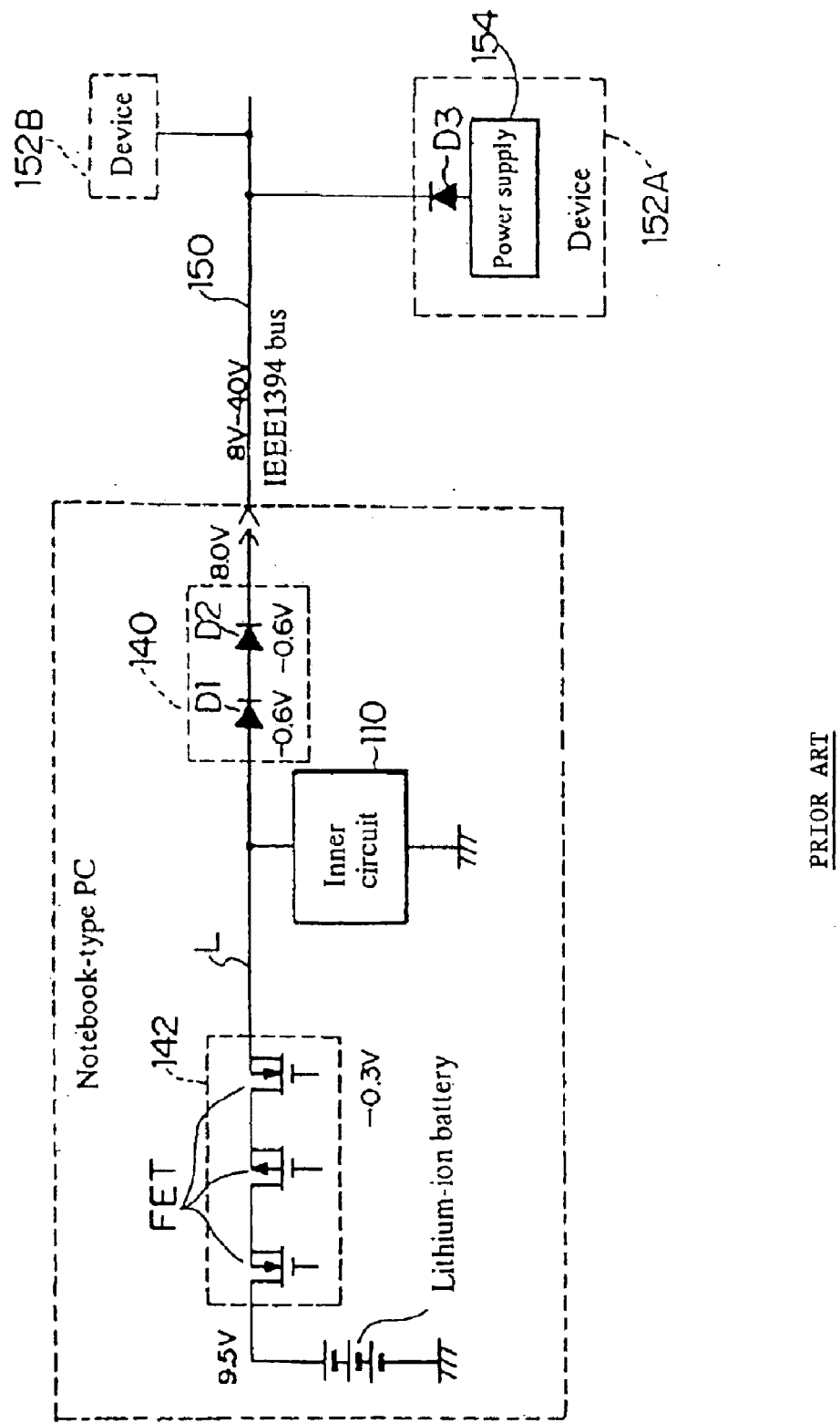
PRIOR ART

POWER SUPPLY PROTECTION APPARATUS FOR COMPUTER SYSTEM

FIELD OF THE INVENTION

The present invention relates to a power supply protection apparatus for a computer system more particularly to an apparatus that can protect a device connected to a power line from an excessive voltage to flow in the power line, as well as a computer system that employs the apparatus.

BACKGROUND OF THE INVENTION

In recent years, there have appeared some notebook-type personal computers provided with a port for connecting a device conforming to the IEEE1394 standard. The IEEE1394 standard is for fast serial interfaces that enable data to be transferred at 100 Mbps or over. In 1995, the standard was officially adopted by the IEEE (Institute of Electrical and Electronics Engineers). The IEEE1394 standard supports three types of transfer rates at present; 100 Mbps, 200 Mbps, 400 Mbps and enables a total of 63 units to be connected. The maximum distance between those units is 4.5 m and the maximum distance between the outermost devices is 72 m. The IEEE1394 standard also enables a power supply between units (within a voltage range of 8 V and 40 V) through a bus conforming to the IEEE1394 standard (hereafter, referred to as an "IEEE1394 bus"). In addition, because the IEEE1394 standard enables units to be connected to each another without the use of a host computer such as a personal computer, etc., such an IEEE1394 bus is highly expected to be used as an infrastructure in each home network.

On the other hand, a notebook-type personal computer is generally provided with its own battery. With this built-in battery, for example, the user can use his/her notebook-type personal computer in such an environment as a train where no commercial power supply is available. Generally, such a built-in battery can be charged for repetitive use.

If a commercial power supply is available, the user can connect an AC adapter (a device for obtaining a DC output from a commercial AC input) to his/her notebook-type personal computer. Consequently, the battery built in the personal computer can be charged during operation.

Examples of the types of notebook-type PC batteries that can be charged include: a lithium-ion battery pack composed of two 4.2 V lithium-ion batteries connected serially (hereafter, referred to as a "two-serial battery pack"), a lithium-ion battery pack composed of three 4.2 V batteries (a "three-serial battery pack"), and a lithium-ion battery pack composed of four 4.2 V batteries (a "four-serial battery pack") etc. Among these, the three-serial battery pack is most frequently used. This type of lithium-ion battery pack has an advantage in the aspect of power usage efficiency, which is higher than that for two-serial and four-serial battery packs. The three-serial lithium-ion battery pack has an output voltage range from about 9.0 V (at which the battery capacity becomes 0) to 12.6 V(=4.2 V×3).

FIG. 5 shows a notebook-type PC, provided with a three-serial lithium-ion battery pack, which is connected to a device conforming to the IEEE1394 standard via an IEEE1394 bus 150.

As shown in FIG. 5, the notebook-type PC composed as described above is further provided with an input circuit 142, a protection circuit 140, etc. The input circuit 142 includes a field-effect transistor (FET) provided on a power line L between a lithium-ion battery pack and an IEEE1394 bus 150 and used to switch connection/disconnection between a lithium-ion battery and an inner circuit 110 of the notebook-type PC. The protection circuit 140 is composed of two diodes D1 and D2.

A device 152A conforming to the IEEE1394 standard is provided with a power unit 154. On the power line from the power unit 154 to the IEEE1394 bus is provided a protection circuit composed of a diode D3. A device 152B is also composed just like the device 152A.

The protection circuits are provided on the power line of each of the notebook-type PC (diodes D1, D2) and devices 152A, 152B (diode D3) for the following reasons. Because the notebook-type PC and its circuits are connected to devices 152A, 152B via the IEEE1394 bus 150 in a cascade connection manner as shown in FIG. 5, electrical power is supplied to the IEEE1394 bus 150 from a power source which has the highest voltage among lithium-ion batteries and power units 154, provided in the notebook-type PC and the attached devices, respectively.

The power units 154 provided for both devices 152A and 152B can possibly output a voltage within the range 8 V to 40 V as allowed by the IEEE1394 standard. However, the inner circuit 110 of the notebook-type PC, as well as the inner circuits of both devices 152A and 152B may not withstand voltages at the higher end of this range and thus to prevent such voltages being applied from external sources, a diode D3 is connected to each power line in the manner shown in FIG. 5.

Furthermore, the two diodes D1 and D2 are provided in the notebook-type PC so that they compose the protection circuit 140 such that one of them can protect the inner circuit 110 of the PC when the other is damaged by a short-circuit caused by a fault, a trouble, etc. This is because another serious trouble (breakage, smoking, ignition, etc.) must be prevented for the reason of safety when any component is down. This is the reason why two diodes D1 and D2 are usually provided so as to protect the inner circuit against such troubles.

However, even when a protection circuit is composed of two diodes as described above, the conventional technique has been impossible to solve a problem that the use efficiency of the lithium-ion battery is low.

To take an example, in the case of the configuration shown in FIG. 5, the biggest drop caused by the input circuit 142 is usually about 0.3 V. The voltage drop of each of the diodes D1 and D2 is typically about 0.6 V, so the biggest total voltage drop in the power line L is about 1.5 V. In order to supply a voltage of 8.0 V to a device conforming to the IEEE1394 standard, therefore, the voltage of a lithium-ion battery cannot go outside a range of about 9.5 V(=8.0 V+about 1.5 V) to 12.6 V. Consequently, this configuration does not permit use of the full capacity of the lithium-ion battery. Therefore, the power supply to the object device corresponding to the IEEE1394 standard must be stopped even when the residual capacity is still enough.

Generally, a notebook-type PC requires a voltage of 8 V or under (ex., 7.5 V). For a battery that does not conform to the IEEE1394 standard, therefore, the notebook-type PC can lower the output voltage up to the above requirement. For a battery conforming to the IEEE1394 standard, however, the conventional technique, which causes a large voltage drop in the power line, sometimes disables supply of electrical power to external devices if the voltage of the battery drops. To avoid such a problem, therefore, the notebook-type PC is provided with an internal boosting DC/DC converter, so as to boost the output voltage to 8 V or over. This causes an increase in the manufacturing cost of the notebook PC.

Under such circumstances, it is an object of the present invention to provide a power unit that can ameliorate the aforementioned problems and improve the usage efficiency of the battery connected to a power line, as well as a computer that can improve the usage efficiency of the battery built therein.

SUMMARY OF THE INVENTION

Accordingly there is provided a power unit connected to a power line, that can supply electrical power within a predetermined range. It is provided with a singular diode for limiting the flow of the electrical power to one direction. This diode corresponds to one of the two diodes composing a protection circuit for an inner circuit in the conventional technique (see FIG. 5). This singular diode can be one of a junction diode, a Zener diode, or the like.

Furthermore, in the power unit of the present invention, the voltage value of the power line is detected by a voltage sensor and the power line is disconnected by a switch unit if the detected voltage exceeds a predetermined voltage value, which is over a voltage level to be protected by the above diode. The power line is connected when the voltage level is under the predetermined voltage value. Consequently, the power line can be prevented from an excessive voltage over the predetermined voltage value even when the diode breaks down for any reason.

As described above, it is possible to compose the power unit so that an excessive voltage value can be prevented from applying to the power line without using two diodes even when the singular diode is down for any reason. The voltage drop of the power line can thus be reduced more than that of the conventional technique that uses two diodes. As a result, when a battery is connected to the power line, the effective utilization of the battery capacity can be improved more.

Furthermore, according to the present invention, the power consumption (about 0.2 W) of the singular diode is reduced over that of the conventional technique that uses two diodes. Consequently, the effective utilization of the battery capacity can also be improved in this aspect.

The voltage drop of the power line should be preferably minimized for operating the switch unit. Consequently, the switch unit is preferably composed so as to include a transistor element whose resistance is smaller than those of other switches. Then, the transistor element should preferably be connected to the power line so as to disconnect and connect the power line according to the control of the ON/OFF state of the transistor. In addition, the transistor element in this case should more preferably be a FET whose ON resistance is lower than that of the bipolar transistor. And, the MOS type FET will be favorable, since its ON resistance is lower than that of the junction type FET among FETs.

The switch unit is preferably provided with a limiting element that can supply predetermined electrical power in the direction opposite to the one direction described above when the power line is disconnected. Consequently, this limiting element can cooperate with the diode so as to control the supply of the electric power doubly to the one direction described above. Excessive application of a voltage to the power line can thus be prevented more effectively. This limiting element may be a Zener diode, as well as a body diode or the like of a transistor when the switch unit includes a transistor element.

On the other hand, if a component operated with electrical power supplied from the power line exists at the upstream side of the one direction, then the predetermined voltage value should preferably be under a dielectric strength voltage value of the component. This will protect the power line from a voltage to be applied over the dielectric strength voltage value of the component.

Furthermore, the power line can be connected to the power line of another device conforming to the IEEE1394 standard. Because the IEEE1394 standard allows voltage within a range of 8 V to 40 V as described above, 40 V might be applied to the power line of the present invention in maximum. If a component whose dielectric strength voltage value is less than 40 V is connected to the power line, therefore, the present invention can protect the component.

Also there is provided a computer system including such a power unit a battery for supplying electric power to the power line of the power unit; a terminal connected to the power line and the power line of each external device; and a load of the computer connected to the power line and driven with electric power supplied from the battery. The above battery may be a two-serial, three-serial, or four-serial lithium-ion battery pack. It may also be a seven-serial or eight-serial nickel-hydrogen battery pack, or the like.

Therefore, even if the singular diode is down for any reason, application of excessive voltage to the power line can be prevented without the need to use two diodes. It is thus possible to reduce the voltage drop of the power line more effectively than the conventional technique that requires two diodes. As a result, it is also possible to improve the effective utilization of the battery capacity built in the computer.

The preferred embodiments of the present invention will now be described by way of example only, with reference to the accompanying drawings.

BRIEF DESCRIPTION OF THE DRAWINGS

FIG. 1 is a schematic block diagram of a computer system according to an embodiment of the present invention;

FIG. 2 is a perspective external view of a notebook-type personal computer (PC);

FIG. 3 is a circuit diagram (a block diagram partially) of the notebook-type PC in a first embodiment of the present invention;

FIG. 4 is a block diagram (a circuit diagram partially) of a protection circuit in a second embodiment of the present invention; and FIG. 5 is a block diagram showing the conventional technique.

DETAILED DESCRIPTION OF THE PREFERRED EMBODIMENTS

FIG. 1 is an explanatory view of a hardware configuration of a computer system 10 composed of a typical personal computer (PC) that employs the power unit of the present invention. The configuration is divided into sub-systems. The PC of the present invention is, for example, a notebook-type PC 12 (FIG. 2) conforming to the OADG (PC Open Architecture Developer's Group) specifications and using "Windows98" or "NT" of Microsoft Corporation or "OS/2" of IBM Corporation as an operating system (OS). Hereafter, each component of the computer system 10 will be described.

CPU 14 is a brain (core part) of the whole computer system 10. The CPU 14 executes various programs under the control of the OS. The CPU 14 may be, for example, one of the Pentium family of CPU chips from Intel or another CPU of another company, such as AMD, etc. It may also be a PowerPC chip from IBM.

The CPU 14 is connected to each hardware component (to be described later) via one or more of three buses: an FS (Front Side) bus 18 used to connect directly to an external pin; a PCI (Peripheral Component Interconnect) bus 20 used for fast I/O devices; and an ISA (Industry Standard Architecture) bus 22 used for slow I/O devices.

Both FS bus 18 and PCI bus 20 are connected to each other via a CPU bridge (host-PCI bridge) 24, which is generally referred to as a memory/PCI control chip.

A main memory 16 is a writable memory used as an area for reading execution programs or writing processed data of the execution programs of the CPU 14.

The PCI bus 20 can transfer data comparatively fast and it is connected to such PCI devices as a card bus controller 30, etc., which are driven comparatively fast.

A video sub-system 26 is used to realize video related functions. It includes a video controller that processes drawing instructions from the CPU 14 and writes processed drawing information in a video memory (VRAM) once, as well as to read the drawing information from the VRAM and output the information onto a liquid crystal display (LCD) 28 (FIG. 2) as drawing data.

The PCI bus 20 is also connected to a card bus controller 30, an audio sub-system 32, a docking station interface (Dock I/F) 34, and a mini-PCI slot 36. The card bus controller 30 is a dedicated controller for connecting the bus signal of the PCI bus 20 to the interface connector (card bus) of the PCI card bus slot 38. The card bus slot 38 is disposed, for example, on the wall surface of the body of the PC 12. In the card bus slot 38 is loaded a PC card 40 conforming to the specifications (for example, "PC Card Standard 95") regulated by the PCMCIA (Personal Computer memory association)/JEIDA (Japan Electronic Industry Development Association).

The Dock I/F 34 is hardware used for connecting the PC 12 to the docking station (not illustrated). The mini-PCI slot 36 is connected to a network adapter 42 for connecting, for example, the computer system 10 to a network (ex., LAN).

The PCI bus 20 and the ISA bus 22 are connected to each other via an I/O bridge 44. The I/O bridge 44 is provided with a bridging function for bridging between the PCI bus 20 and the ISA bus 22, an IDE (Integrated Drive Electronics) interface function, a USB (Universal Serial Bus) function, etc. The I/O bridge 44 may be, for example, a PIIX4 device (core chip) of Intel. The IDE interface driven by the IDE interface function is connected to an IDE hard disk drive (HDD) 46, as well as an IDE CD-ROM drive 48 via an ATAPI (AT Attachment Packet Interface).

Furthermore, the I/O bridge 44 is provided with a USB port, which is connected to a USB connector 50 provided, for example, on the wall surface of the body of the PC 12.

The I/O bridge 44 is further connected to an EEPROM 94 via an SM bus. The EEPROM 94 is a memory for holding such information as a password, a supervisor password, a product serial number, etc. registered by the user respectively. The EEPROM 94 is a non-volatile memory that enables data to be rewritten electrically.

The I/O bridge 44 is also connected to a power supply circuit 54. The power supply circuit 54 is composed of such circuits as a power selector circuit 63 for selectively switching a battery to be charged to the main battery 64A or second battery 64B; a charger circuit 68 for charging the main battery 64A or second battery 64B; a DC/DC converter 66 for generating such a DC constant voltage as 5 V, 3.3 V, etc. used in the computer system 10, a protection circuit 112 for protecting the inner circuits of the computer system 10, etc. Each of the main battery 64A and the second battery 64B is a lithium battery pack composed of three lithium-ion batteries (rated voltage: 4.2 V) connected serially. Consequently, each of those batteries 64A and 64B can supply an electric power at a voltage within about 9.0 V at which the battery capacity becomes 0 and 12.6 V.

Provided inside the core chip composing the I/O bridge 44 is an internal register for managing the power status of the computer system 10 and a logic (state machine) for managing the power status of the computer system 10 including the operation of the internal register.

The above logic sends/receives various signals to/from the power supply circuit 54. According to this sending/receiving of signals, the power supply circuit 54 recognizes the status of actual power supply to the computer system 10 and the power supply circuit 54 controls supply of the electric power to the computer system 10 according to the instruction from the above logic.

The data transfer rate of the ISA bus 22 is lower than that of the PCI bus 20. The ISA bus 22 is used to connect a flash ROM 72 composed of a super I/O controller 70, an EEPROM, etc., an embedded controller 80 connected to a CMOS 74 and a gate array logic 76, and such comparatively slow peripheral devices (not illustrated) as a keyboard/mouse controller.

The super I/O controller 70 is connected to an I/O port 78. The super I/O controller 70 controls driving of a floppy disk drive (FDD), parallel data input/output via a parallel port, and serial data input/output via a serial port.

The flash ROM 72 is a memory for holding such programs as BIOS, etc. It is a non-volatile memory that can rewrite its stored data electrically. The CMOS 74 is a volatile semiconductor memory connected to a backup power supply. The CMOS 74 functions as a fast non-volatile memory.

The embedded controller 80 controls the keyboard (not illustrated) and a power management controller (PMC) 82 built therein (see FIG. 3) takes part of the power supply management function in cooperation with the gate array logic 76.

FIG. 3 shows a block diagram of components of the PC 12 of this embodiment. In FIG. 3, each component of the power supply circuit 54, which is especially relevant to the present invention, is shown in detail. As shown in FIG. 3, the PC 12 is provided with a power line L laid between an input terminal T connected to an AC adapter 62 and a port P connected to the IEEE1394 bus 150; a power selector circuit 63; a main battery 64A; a second battery 64B; a charger circuit 68; an inner circuit 110; and a protection circuit 112. Although not illustrated in FIG. 3, the IEEE1394 bus 150 is connected to a plurality of devices conforming to the IEEE1394 standard in a cascade connection manner.

The power selector circuit 63 is provided with a first serial circuit 100 disposed between the power line L and the main battery 64A and a second serial circuit 102 disposed between the power line L and the second battery 64B. In this embodiment, the PC 12 of the present invention is also provided with a battery pack housing (not illustrated). The main battery 64A and the second battery 64B are housed in the housing so as to be removed therefrom. While the main battery 64A and the second battery 64B are housed in the battery pack housing, they are connected to the first and second serial circuits 100 and 102 via the input terminals 65A and 65B respectively.

The first serial circuit 100 is provided with FET 1 and FET2 in which cathodes of their body diodes are connected to each other. The FET may be a power MOS type FET. And, just like the first serial circuit 100, the second serial circuit 102 is also provided with FET3 and FET4 in which the cathodes of their body diodes are connected to each other.

For the body diode of each of the FET1 and the FET3, its cathode is connected to the drain D and its anode is connected to the source S of the corresponding FET respectively. For the body diode of each of the FET 2 and the FET 4, its cathode is connected to the source S and its anode is connected to the drain D of the corresponding FET respectively.

On the other hand, a charger circuit 68 is disposed between the power line L and the drain D of the FET 2. The drain D of the FET 2 is connected to the drain D of the FET 4. FET 5 is disposed between this connection point and the power line L so as to prevent short-circuiting of the charger circuit 68 while the charger circuit 68 charges the main battery 64A or second battery 64B. In particular, FET 5 is turned off while the charger circuit 68 charges the main battery 64A or second battery 64B and turned on while one of the main battery 64A and the second battery 64B supplies a DC power to the power line L. In the FET 5 is formed a body diode whose cathode is connected to the drain D and whose anode is connected to the source S.

The output terminals 1 to 5 of each PMC 82 are connected to the gates G of the FET 1 to the FET 5 respectively. The PMC 82 controls ON/OFF of the FET 1 to the FET 5.

On the other hand, the inner circuit 110 is composed of such components as the CPU 14, the main memory 16, etc. other than the power supply circuit 54 (see FIG. 1) and the DC/DC converter 66 of the power supply circuit 54. The inner circuit 110 is connected to the power line L. In the inner circuit 110, only the input terminal of the DC/DC converter 66 is connected directly to the power line L. A necessary electric power is supplied to other components from the output terminal of the DC/DC converter 66. In this embodiment, the inner circuit 110 is designed so that its withstand voltage is 25 V.

The protection circuit 112 includes FET 6, a diode D2, and a switching circuit 113. The protection circuit 112 is disposed between the inner circuit 110 of the power line L and the port P.

The FET 6 is connected serially to the power line L so that its source S comes to the inner circuit 110 side and its drain D comes to the port P side. In the FET 6, its source S is connected to its gate G via a resistor. In the FET 6 is formed a body diode D6 so that its cathode is connected to its drain D and its anode is connected to its source S respectively. The FET 6 may be a power MOS type FET. The diode D2 is disposed serially between the drain D of the FET 6 and the port P so that its cathode comes to the port P side.

The switching circuit 113 is provided with a voltage dividing resistor circuit in which resistors R1 and R2 are connected serially. One end of the voltage dividing resistor circuit is connected to the port P and the other end thereof is grounded.

A − input terminal (inverted signal input terminal) of the comparator CP is connected to the junction point of each of the resistors R1 and R2 of the voltage dividing resistor circuit. And, an output terminal of a reference voltage generator circuit 114 is connected to a + input terminal (non inverted signal input terminal) of the comparator CP. The reference voltage generator circuit 114 generates and outputs a reference voltage of a predetermined voltage (5 V in this embodiment). Consequently, the output terminal of the comparator CP outputs a signal with a high level voltage if the voltage of the port P, which is divided according to a ratio between the values of the resistors R1 and R2 is lower than the above reference voltage and outputs a signal with a low level voltage if the voltage of the port P, which is divided as described above, is over the reference voltage.

In this embodiment, the ratio between the values of the resistors R1 and R2 are adjusted in advance so that the voltage applied to the − input terminal of the comparator CP becomes equal to the reference voltage (5 V in this embodiment) if the voltage of the port P is equal to the reference voltage (20 V in this embodiment), which is lower than the withstand voltage (25 V in this embodiment) of the inner circuit 110. Consequently, the signal output from the comparator CP becomes a high level one when the voltage of the port P is lower than the reference voltage and a low level one when the voltage of the port P is over the reference voltage.

The output terminal of the comparator CP is connected to the base of the transistor TR1 via a resistor. The emitter of the transistor TR1 is grounded and connected to its own base via a resistor. The collector of the transistor TR1 is connected to the base of the transistor TR2 via a resistor. In addition, the emitter of the transistor TR2 is connected to the output terminal of a charge pump circuit 116 and to its own base via a resistor. The charge pump circuit 116 generates and outputs a voltage on a predetermined voltage level (32 V in this embodiment when an AC adapter 62 is used and 20 V when the main battery 64A or second battery 64B is used). The collector of the transistor TR2 is connected to the gate G of the FET 6 via a resistor.

Consequently, both transistors TR1 and TR2 are turned on when the output signal from the comparator CP is on the high level. The FET 6 is turned on when a voltage generated by the charge pump circuit 116 is applied to the gate G thereof. On the contrary, both transistors TR1 and TR2 are turned off when the output signal from the comparator CP is on the low level. The FET 6 is thus turned off.

The single diode of the present invention takes the form of the diode D2 in this embodiment. A voltage dividing resistor circuit composed of the resistors R1 and R2 is equivalent to the voltage sensor of the present invention. The FET 6 is equivalent to the transistor element of the present invention. The body diode D6 provided in the FET 6 is equivalent to the limiting element of the present invention. The section composed of the FET 6 and the switching circuit 113 is equivalent to the switch unit of the present invention. The inner circuit 110 is equivalent to the drive unit and the computer load of the present invention. The port P is equivalent to the terminal of the present invention.

In order to compose the computer system 10, however, many more electric circuits other than those shown in FIGS. 1 and 3 are required. Those electric circuits are already known well to those skilled in the art and they are not used for the configuration of the present invention. The description for them will thus be omitted in this specification. In addition, only some of the connections between hardware blocks in FIGS. 1 and 3 are shown so as to simplify the description in those drawings.

Next, a description will be made for an operation of the power supply circuit 54 that is related to the present invention especially as an operation of this embodiment. First, a brief explanation will be made on the operation of the power selector circuit 63 referring to FIG. 3.

While the PC 12 is operating and the main battery 64A is charged by the charger circuit 68, the PMC 82 turns on both FET 1 and FET 2. At this time, the PMC 82 turns off both FET 3 and FET 4 so as to prevent short-circuiting that might occur between the main battery 64A and the second battery 64B and turns off the FET 5 so as to prevent short-circuiting that might occur in the charger circuit 68.

In the same way, while the PC 12 is operating and the second battery 64B is charged by the charger circuit 68, the PMC 82 turns on both FET 3 and FET 4. At this time, the PMC 82 turns off both FET 1 and FET 2 so as to prevent short-circuiting that might occur between the main battery 64A and the second battery 64B and turns off the FET 5 so as to prevent short-circuiting that might occur in the charger circuit 68.

On the other hand, while the PC 12 is operating and none of the batteries 64A and 64B is charged, the PMC 82 turns off the FET 1, turns on the FET 2, turns off the FET 3, turns on the FET 4, and turns off the FET 5 respectively. At this time, if the PMC 82 detects a disconnected AC adapter 62 and the main battery 64A supplies electrical power, the PMC 82 turns on the FET 1 and the FET 2, turns off the FET 3 and FET 4, and turns on the FET 5. In the same way, if the second battery 64B keeps supplying the power, the PMC 82 turns off the FET 1 and FET 2, turns on the FET 3, the FET 4, and the FET 5 respectively. Consequently, even when the AC adapter 62 is disconnected by accident, either the main battery 64A or the second battery 64B continuously supplies the power to the inner circuit 110. The PC 12 can thus be prevented from shut-down caused by disconnection of the AC adapter 62.

Next, the operation of the protection circuit 112 will be described. It is premised here that one of the main battery 64A and the second battery 64B supplies electrical power to the power line L. A description will be made for two cases with respect to the voltage of the port P; when it is over the reference voltage (20 V in this embodiment) and when it is under the reference voltage.

(1) When the voltage of the port P is over the reference voltage in this case, the PC 12 does not supply an electric power to the IEEE1394 bus 150. A device (not illustrated) connected to the IEEE1394 bus 150 and conforming to the IEEE1394 supplies the power to the IEEE1394 bus 150.

In this case, the output signal from the comparator CP is on the low level and both transistors TR1 and TR2 are turned off, thereby the FET 6 is turned off. At this time, the inner circuit 110 is protected by the two diodes D2 and D6 disposed in the FET 6.

Generally, the forward voltage of each body diode in the FET is 1 V or over (ex., 1.2 V). It is larger than the forward voltage (ex., 0.6 V) of the ordinary schottky diode. When compared with the conventional protection circuit composed of two ordinary diodes (see FIG. 5), the voltage drop of the power line in the protection circuit 112 is larger. In this case, however, because another device supplies the power to the IEEE1394 bus 150, no problem arises.

(2) When the voltage of the port P is under the reference voltage In this case, the output from the comparator CP is on the high level and both transistors TR1 and TR2 are turned on, thereby the FET 6 is turned on. Consequently, only the diode D2 is used in the protection circuit 112.

In this case, there are expected two patterns in power supply to the IEEE1394 bus 150; from the PC 12 and from another device at a voltage over that of the PC 12 and under the reference voltage.

If the PC 12 supplies a power to the IEEE1394 bus 150, only one diode is used in the protection circuit 112. The voltage drop to be caused by the protection circuit 112 becomes 0.6 V or so. The voltage drop can thus be suppressed to about a half of that in the conventional protection circuit in which two ordinary diodes are used (the voltage drop is about 1.2 V in this case).

Consequently, if the voltage drop caused by each FET in the power selector circuit 63 is about 0.3 V, the total voltage drop of the power line L becomes about 0.9 V(=about 0.3 V+about 0.6 V). In this case, the battery (the main battery 64A or second battery 64B) can be used up to about 9.0 V at which the capacity of the battery becomes 0. The use efficiency of the battery can thus be improved. Furthermore, the power consumption (about 0.2 W) can be saved as much as that of the omitted diode.

Because the voltage drop of the power line L can be reduced such way, it is also possible to lower the output voltage from the main battery 64A and the second battery 64B up to 8 V or over, which is applied to the IEEE1394 bus 150 and required for the inner circuit 110 of the PC 12.

Because the voltage drop of the power line L can be reduced such way, it is also possible to keep the voltage applied to the IEEE1394 bus 150 to 8 V or over even when the battery is used until its capacity becomes 0. And, it is possible to omit such a boosting device as a DC/DC converter, etc., thereby reducing the manufacturing cost more than the conventional technique that requires such a boosting device.

On the other hand, if another device supplies an electric power at a voltage higher than that of the PC 12 and under the reference voltage, the inner circuit 110 whose withstand voltage is 25 V is protected from damages even when the diode D2 is short-circuited and damaged for any reason.

Although a description is made in the above first embodiment for a configuration of the present invention, in which only the inner circuit 110 of the PC 12 is protected from damages, a description will be made in this second embodiment for a configuration of the present invention, in which not only the inner circuit 110 is protected from damages, but also the power line is protected from an excessive current. The configuration and operation of the components other than the protection circuit are the same as those in the first embodiment, so the description for them will be omitted here.

FIG. 4 shows a block diagram of the protection circuit 130 in this second embodiment. As shown in FIG. 4, the protection circuit 130 in this second embodiment includes a resistor R3 for detecting a current, as well as an FET 7, an FET 8, and a Zener diode ZD2 that are connected serially to the power line L. The FET 7 is connected so that its source S comes to the port P side and the FET 8 is connected so that its drain D comes to the port P side respectively. And, the Zener diode ZD2 is connected so that its cathode comes to the port P side.

The FET 7 has a function for preventing an excessive current and the FET 8 has the same function as that of the limiting element of the present invention.

On the other hand, the protection circuit 130 is provided with a current limit circuit 122, a voltage sensor circuit 124, a gate control circuit 126, and a charge pump circuit 128.

The input terminal of the current limit circuit 122 is connected to both ends of the resistor R3. The output terminal of the circuit 122 is connected to the gate control circuit 126. And, the input terminal of the voltage sensor circuit 124 is connected to the port P and the output terminal thereof is connected to the gate control circuit 126. In addition, the output terminal of the charge pump circuit 128 is connected to the gate control circuit 126 and the output terminal of the gate control circuit 126 is connected to the gate G of both FET 7 and FET 8 respectively.

The voltage sensor circuit 124 is equivalent to the voltage sensing means of the present invention. The FET 8 is equivalent to the transistor element of the present invention. And, the section composed of the gate control circuit 126, the charge pump circuit 128, and the FET 8 is equivalent to the switch unit of the present invention. The Zener diode ZD2 is equivalent to the diode of the present invention respectively.

In the protection circuit 130 composed as described above, the current limit circuit 122 detects the current flowing in the power line L and outputs a high level signal to the gate control circuit 126 when the detected current is lower than the value of a predetermined limit current. The voltage sensor circuit 124 detects the voltage of the port P and outputs a signal in accordance with the level of the detected voltage to the gate control circuit 126. In addition, the charge pump circuit 128 generates a voltage on a level (32 V when the AC adapter 62 is used and 20 V when the main 64A or second battery 64B is used in this embodiment) that can turn on both FET 7 and FET 8 and outputs the signal to the gate control circuit 126.

The gate control circuit 126 controls the ON/OFF of both FET 7 and FET 8 according to the signal received from the current control circuit 122 and the voltage sensor circuit 124. Concretely, both FET 7 and FET 8 are turned on only when the level of the signal received from the current control circuit 122 is high and the level of the signal received from the voltage sensor circuit 124 is lower than the level corresponding to a predetermined reference voltage. In other cases, both FET 7 and FET 8 are turned off.

The gate control circuit 126 applies a voltage received from the charge pump circuit 128 to the gate G of both FET 7 and FET 8 respectively when turning on the FET 7 and the FET 8. The reference voltage in this embodiment is the same as that in the above first embodiment.

According to the controlling of both FET 7 and FET 8 by the gate control circuit 126, the FET 7 and the FET 8 are turned off if the value of the current flowing in the power line L is over the value of the above limit current and when the voltage of the port P is over the above reference voltage. The value of the current flowing in the power line L is thus limited and the inner circuit 110 of the PC 12 is protected.

As described above, because the protection circuit in this second embodiment has a section (concretely, the gate control circuit 126 and the charge pump circuit 128) to be used by both of the circuit for limiting the value of the current flowing in the power line L and the circuit for protecting the inner circuit 110, it can be provided with many functions at a low cost.

Although the protection circuit is composed of single units in the above embodiments, the present invention is not limited only to that; the protection circuit may also be composed of an IC (Integrated Circuit), of course. In such a case, the protection circuit can be reduced in both size and cost, as well as its reliability is more improved.

And, in this case, it should preferably be considered that the section (an area 120 enclosed by a broken line in FIG. 4 in the second embodiment) other than the diode (the diode D2 in the first embodiment and the Zener diode ZD2 in the second embodiment) connected serially to the power line L should preferably be formed as an IC. That is, the diode connected serially to the power line L is composed separately from such an IC, thereby a given rate can be employed for the diode according to the maximum voltage to be applied to the power line. The general-purpose properties of the IC can thus be increased more.

In the above embodiments, a description is made only for a case in which one switch unit of the present invention is provided for the power line L. This present invention is not limited only to such a case, however; a plurality of such switch units can be provided for the power line L. In this case, the reliability of the protection circuit will be improved more than in the above embodiments, although the manufacturing cost is increased.

As described above, according to the present invention, therefore, a protection circuit can be composed so as to prevent excessive application of a voltage to the power line even when the singular diode is down for any reason. And, there is no need to use two diodes for the protection circuit. It is thus possible to reduce the voltage drop to occur in the power line more effectively than the conventional technique that requires two diodes. As a result, the use efficiency of the battery connected to the power line can be improved significantly.

What is claimed is:

1. A computer system comprising:
   a battery for supplying electrical power over a power line;
   data processing circuitry connected to said power line and supplied with electrical power by said battery, said data processing circuitry having associated therewith a withstand voltage value above which at least a portion of said data processing circuitry is not designed to operate;
   a terminal connected to said power line, for connecting said computer system to at least one external device over a bus;
   system protection circuitry connected to said power line, disposed between said data processing circuitry and said terminal, for protecting the data processing circuitry from voltages greater than said withstand voltage value caused on said power line by said at least one external device; the system protection circuitry comprising:
      a diode provided in said power line, said diode limiting a flow of electric power to one direction;
      a voltage sensor for detecting voltage values of said power line at said terminal and,
      switching means, responsive to a detection by said voltage sensor of a voltage value greater than a predetermined value, which predetermined value is less than said withstand voltage value, for disconnecting said power line, and responsive to a detection of a voltage value lower than said predetermined value to connect said power line, wherein said switching means includes a limiting element for supplying a predetermined electric power value in a direction opposite to said one direction when said power line is disconnected.

2. A computer system according to claim 1 said bus conforms to the IEEE1394 standard adopted by the IEEE in 1995.

3. A computer system according to claim 1 wherein said bus carries thereon a voltage of a level which would damage said computer system.

4. Power supply protection apparatus comprising:
   a diode for limiting a flow of electric power to one direction, said diode being provided in a power line that enables power supply within a predetermined range of said electric power;

a voltage sensor for detecting a voltage value of said power line; and a switch unit for disconnecting said power line when a voltage value detected by said voltage sensor is greater than a predetermined value, and connecting said power line when said voltage value detected by said voltage sensor is less than said predetermined value, wherein said switch unit includes a limiting element for supplying a predetermined electric power value in a direction opposite to said one direction when said power line is disconnected.

5. Apparatus according to claim 4 wherein said switch unit includes a transistor element.

6. Apparatus according to claim 4 wherein said predetermined voltage value is less than a dielectric strength voltage value of a component of said first device operated with electric power supplied from said power line, said component being provided upstream of said one direction.

7. Apparatus according to claim 4 wherein said power line is connected to a terminal of said first device for connecting to a power line of a second device conforming to the IEEE1394 standard adopted by the IEEE in 1995.

8. Apparatus according to claim 4, wherein said power line is connected to a terminal of said first device for connecting to a power line of a second device, said second device capable of supplying to said terminal of said first device a voltage of a level which would damage said first device.

* * * * *